June 24, 1930.  B. D. BROWN  1,767,832
DEVICE FOR REPLACING CHECKER BRICKS
Filed Oct. 3, 1927   2 Sheets-Sheet 1

Inventor
Banks D. Brown
By his Attorney
Norman N. Holland

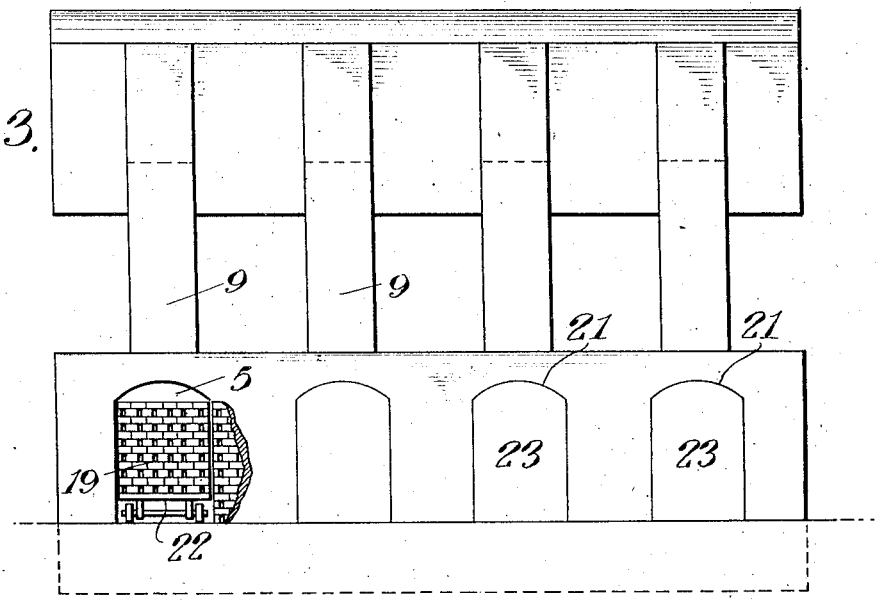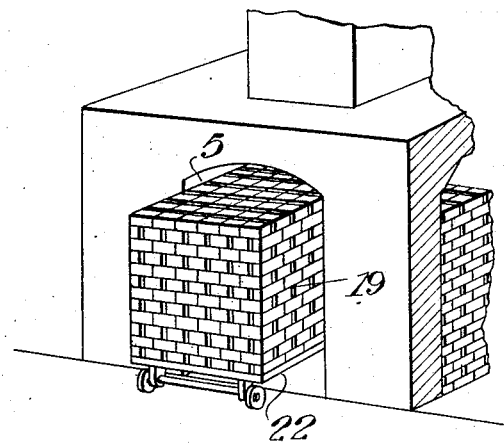

Patented June 24, 1930

1,767,832

UNITED STATES PATENT OFFICE

BANKS D. BROWN, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE

DEVICE FOR REPLACING CHECKER BRICKS

Application filed October 3, 1927. Serial No. 223,539.

The present invention relates to furnaces and more particularly to a device for removing and replacing checker work in the checker chambers thereof.

In the manufacture of glass and the like, regenerative furnaces have been found to be more efficient than other types of furnaces and have been generally adopted. Such furnaces usually comprise two checker chambers on each side with passages leading from the checker chambers to the furnace proper. Air and fuel are supplied separately to the two chambers on one side where they are preheated and delivered to the furnace to be mixed and burned. The exhaust gases leave through the two checker chambers on the opposite side of the furnace, which absorb a portion of the waste heat therein. Accordingly, the checker chambers are preheated on one side by the exhaust gases while the chambers on the other side are being cooled by the incoming air and fuel. At intervals of about thirty minutes the direction of the gases is reversed so that the chambers which were receiving the exhaust gases are permitted to receive and preheat the air and fuel, while the chambers which were cooled by the air and fuel receive the exhaust gases. In this way the waste heat in the exhaust gases is utilized for preheating the fuel and air prior to its entry to the furnace. The advantages of this are two-fold; first, there is a recovery of waste energy from the exhaust gases; and secondly, by preheating the air and fuel the operating temperature of the furnace is materially increased. The latter is quite important particularly where fuels are used which produce low flame temperatures.

One of the objections to regenerative furnaces is that the checker work accumulates a considerable amount of deleterious matter such as soot, dust and the like, which impairs its efficiency. The soot and dust, being poor conductors of heat, prevent the checker work from absorbing heat from the waste gases and likewise make it difficult for the incoming fuel and air to absorb heat from the checker work. It has been the custom in the past, and it is necessary from time to time, to replace the checker work. This has been done by shutting down the furnace and permitting it and its charge of glass to cool so that workmen could enter the chambers to remove and replace the brick forming the checker work.

Such procedure is extremely expensive because of the loss of service of the glass furnace and particularly because several days are required to bring the batch of glass back to working condition, and even then the resulting glass is never as good as if it had not been subjected to this loss of temperature. An additional expense is due to the fact that all of the checker brick is removed while only those portions beneath the ports leading to the furnace need replacing. The loss due to the non-use of the furnace for several days is extended by the loss due to the damaged batch of glass.

An object of the present invention is to eliminate the difficulties encountered in the removal and replacement of the checker brick as noted above.

Another object of the invention is to provide a device for replacing the worn checker bricks without interfering materially with the operation of the furnace.

Another object of the invention is to minimize the time and labor consumed in the replacement of checker brick.

A further object of the invention is to minimize the cost of the replacement of checker brick by decreasing the amount of labor required and by removing only those portions of checker brick which need replacement.

Another object of the invention is to facilitate removal and replacement of the worn checker brick by segregating those portions of checker brick which are subjected to hardest wear.

Other and further objects of the invention will be obvious upon an understanding of the illustrated embodiment about to be described and many advantages, not referred to herein, will occur to one skilled in the art upon reading the description or upon employment of the invention in practice.

A preferred embodiment of the invention has been chosen for purposes of illustration and description and is shown in the accompanying drawings, wherein Fig. 1 is a top plan view of a portion of the furnace;

Fig. 3 is a side elevational view with one of the arches opened showing a truck with checker work mounted thereon; and Fig. 4 is a detailed view illustrating a truck partially removed from the checker chamber.

Figure 1:
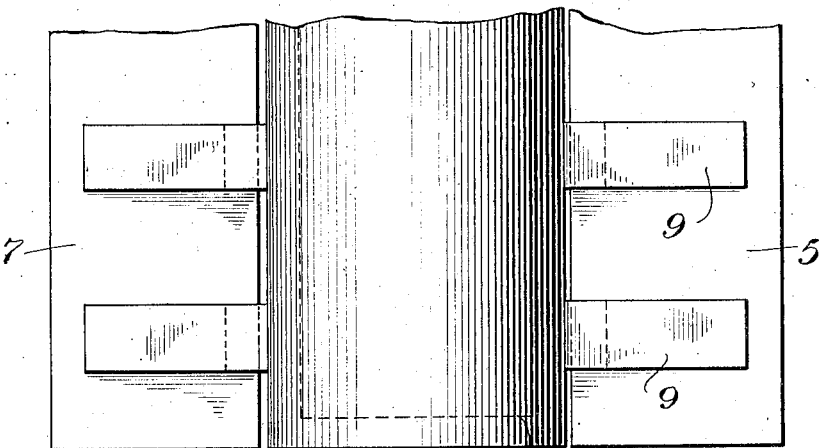
Figure 2:
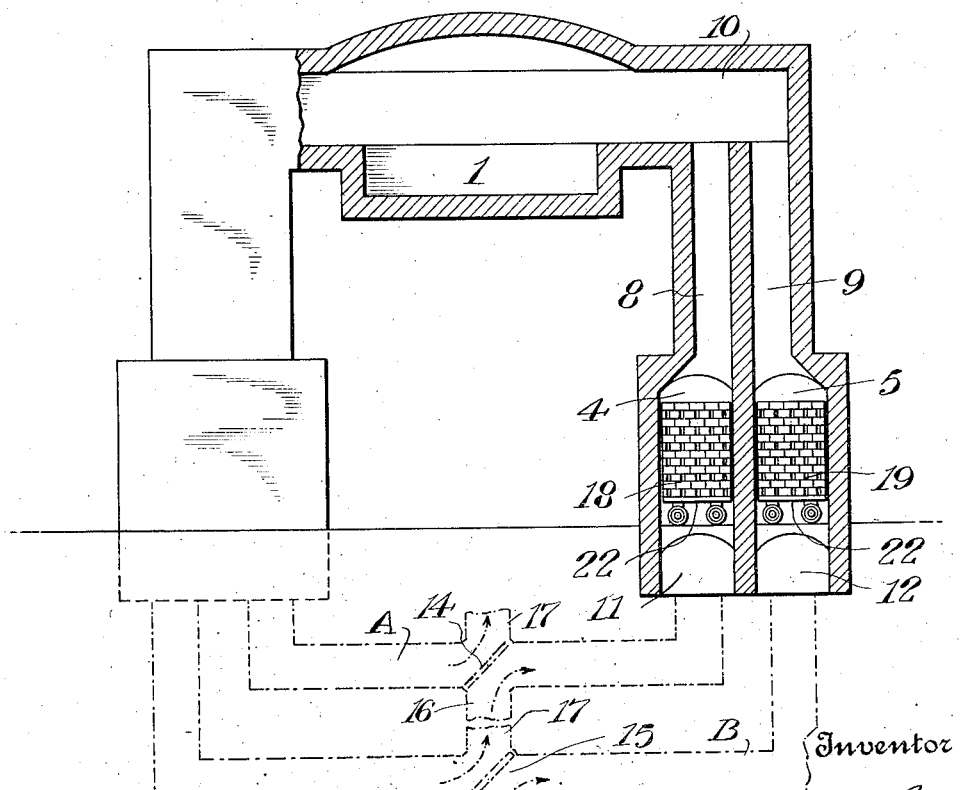
Fig. 2 is an end elevational view partly in section illustrating one form of furnace to which the present invention is applicable.

Referring to the drawings there is shown a glass furnace adapted to receive a batch of glass at 1. The glass is melted and kept at the proper temperature by means of the combustion of gases issuing directly from the respective sides of the melting furnace. On one side of the furnace is a pair of checker chambers 4 and 5 shown in section in Fig. 2, and on the other side of the furnace is a corresponding pair of chambers, not shown in detail. Suitable flues 8 and 9 lead upwardly to the ports 10 of the furnace. The side walls of the furnace as well as the side walls and other portions of the checker chambers may be formed from the usual type of refractory brick used in this class of work. Extending below the checker chambers are flues 11 and 12 which are connected to the pipes A and B.

The pipes A and B and dampers 14 and 15 respectively, are shown in broken lines to illustrate diagrammatically one arrangement whereby the flues 11 and 12 and the corresponding checker chambers may be connected respectively to air and fuel gas while the checker chambers on the other side of the furnace are connected to the stack. The dampers shown herein are diagrammatically illustrated as movable in two positions at substantially right angles to each other and with the fuel pipe 16 extending downwardly and the stack pipe 17 extending upwardly therefrom. It will be understood that when the damper is turned in one direction one side of the pipe B will be connected to the stack and the other to the supply of fuel. It will also be understood that the air pipe A and the damper therein operate in a similar manner.

In the operation of such a furnace, gas and air respectively are supplied through the pipes A and B and flow upwardly through the checker chambers 18 and 19 where it is preheated and delivered independently to the flues 8 and 9 passing through the port 10 into the melting furnace 1 where the gaseous fuel and air mix and burn. In this way glass in the melting furnace is maintained at the proper temperature and the waste gases flow out through the ports 10 on the opposite side of the furnace through flues similar to 8 and 9 and through checker chambers similar to 4 and 5 which absorb a substantial part of their heat. Thereafter, the gases pass through pipes A and B to the stack. In this way while the checker chambers 4 and 5 are preheating air and fuel, the corresponding checker chambers on the other side of the furnace are being heated by the waste gases. About every thirty minutes it becomes necessary to reverse the direction of the gases so that the entering gases will pass through the heated checker chambers and the exhaust gases will flow through the chambers which have been previously cooled by being used as the preheating chambers. This is done by means of the dampers previously described.

The glass in such furnaces is not permitted to cool, even at night, due to the fact that a long period of time is required to remelt it and due further to the fact that articles fabricated from remelted glass do not have the same quality as they otherwise would have had. After a considerable period of time, six months or a year, dependent upon the type of fuel used, the checker brick becomes clogged or at least thickly coated with soot, dust, dirt, and other accumulations. It is then necessary, in spite of the great loss, to shut down the furnace over a period of several days to permit it to cool so that workmen may enter the checker chambers and remove and replace all the checker brick. This requires considerable time and labor as well as the loss of production for several days. In addition, as pointed out above, the glass in the melting furnace having hardened, has to be remelted and its quality is materially affected.

The present invention avoids these disadvantages by providing a series of arches 21 on the respective side walls of the checker chambers directly beneath the flues 8 and 9 and the ports 10 leading to the melting furnace. Adjacent these arches and beneath the flues 8 and 9 small trucks 22 of special construction, are mounted in the checker chambers. A section of checker brick is mounted upon the trucks and segregated from the remaining checker brick in the checker chambers. The truck and checker brick mounted thereon are of proper size to pass readily through the arches 21 when the portion of the chamber wall thereunder is removed. Since, in the operation of the furnace, the deposits are formed almost entirely beneath the ports 10, the checker work on the truck will be chiefly affected. When the efficiency of the furnace has become impaired, suitable extra trucks may be provided with new checker brick and placed in readiness. The portions of the side wall 23 of the checker chambers beneath the arches 21 may be removed and the truck within the chamber rolled out with the checker brick thereon and the truck with the new checker brick rolled in to replace it. The arches 21 in the side walls of the chambers will permit the removal of the portions 23 without damage to the other portions of the wall of the checker chambers. The opening formed is adequate to permit the removal of the segregated section of checker brick mounted upon the truck. The portions 23 of the checker chamber may be similar to the main walls in which case the bricks can be removed and replaced individually; or, if desired, the portions 23 may be specially constructed to permit removal of sections thereof.

The temporary opening in the wall of the checker chambers for the removal of the truck may be made and closed rapidly. During this short period the gas may be shut off, without interfering materially with the operation of the furnace, since the batch of glass, being a poor conductor of heat, is not affected by external changes in temperature, which are of short duration. Before any appreciable change can be noted in the molten glass, the replacement of a section of checker brick may be effected and the supply of fuel to the combustion chamber resumed. In this manner the loss occasioned heretofore by the inferior quality of glass, caused by permitting the furnace to cool and the glass to harden so that workmen could remove and replace the worn checker brick, is eliminated. Continuous use of the furnace is also assured.

It will be seen that the present invention contemplates the removal of the worn portions of the checker brick in a minimum time without interfering materially with the operation of the furnace. Further, the cost of constructing the furnace is not materially increased and the invention may be applied to existing furnaces at a minimum cost. The trucks may be inexpensively manufactured and used repeatedly. By removing only a portion of the checker brick a substantial saving is attained and the removals may be made more frequently thereby increasing materially the efficiency of the furnace.

As various changes may be made in the above embodiment without departing from the spirit of the invention, it is to be understood that all matter herein is to be interpreted as illustrative and not in a limiting sense.

Having thus described my invention, I claim:

1. In a regenerative glass furnace, the combination of checker chambers associated therewith, passages leading from said chambers to said furnace, whereby certain of said chambers may be used to preheat the incoming gases and other chambers may receive the exhaust gases and absorb heat therefrom, segregated sections of checker work mounted beneath said passages, arched constructions in the side wall of the furnace adjacent the segregated sections, whereby a portion of the wall of the chamber being used for preheating gases may be removed and said segregated section of checker work removed as a unit without deranging adjacent checker work and without shutting down the furnace.

2. In a regenerative glass furnace, the combination of checker chambers associated therewith, passages leading from said chambers to said furnace whereby certain of said chambers may be used to preheat the incoming gases and other chambers may receive the exhaust gases and absorb heat therefrom, removable portions in the side wall of the checker chambers beneath said passages, segregated portions of checker work adjacent thereto, whereby said portions may be removed and said segregated portions of worn checker work removed from said chambers as a unit without shutting down the furnace.

BANKS D. BROWN.